United States Patent [19]

Leveque

[11] 4,028,952

[45] June 14, 1977

[54] SPEED VARIATOR EMPLOYING FRICTION HAVING AN IMPROVED FRICTION ELEMENTS-TIGHTENING DEVICE

[75] Inventor: René Leveque, Orgeval, France

[73] Assignee: Automobiles Peugeot, Paris, France

[22] Filed: Nov. 18, 1975

[21] Appl. No.: 633,095

[30] Foreign Application Priority Data

Nov. 18, 1974 France .................. 74.37871

[52] U.S. Cl. ............................................. 74/199
[51] Int. Cl.² ....................................... F16H 15/08
[58] Field of Search ............... 74/199, 796, 721; 91/52, 401; 192/54

[56] References Cited

UNITED STATES PATENTS

| | | | |
|---|---|---|---|
| 2,670,828 | 3/1954 | McFarland | 91/52 |
| 2,677,417 | 5/1954 | Logan et al. | 91/52 |
| 2,743,621 | 5/1956 | Beier | 74/199 |
| 3,158,036 | 11/1964 | Hughson | 74/199 |
| 3,387,507 | 11/1968 | Castelet | 74/199 |
| 3,673,882 | 7/1972 | Froumajou et al. | 74/199 |
| 3,690,192 | 9/1972 | Bouthers et al. | 74/199 |

Primary Examiner—Samuel Scott
Assistant Examiner—Allan R. Burke
Attorney, Agent, or Firm—Burns, Doane, Swecker & Mathis

[57] ABSTRACT

This invention has for purpose to improve the conditions of the tightening of the friction elements in a speed variator intended in particular to be employed in an automobile vehicle.

It resides mainly in the use of a piston and cylinder assembly as means for pre-tightening the friction elements, this assembly defining a pressure chamber which is connected to the lubrication oil supply pump and to a relatively small-section discharge path. This arrangement permits modulating the pressure of the pre-tightening over a wide range in principle as a function of the temperature of the oil. Preferably, there is also provided a further correction as a function of the speed ratio established in the variator.

9 Claims, 2 Drawing Figures

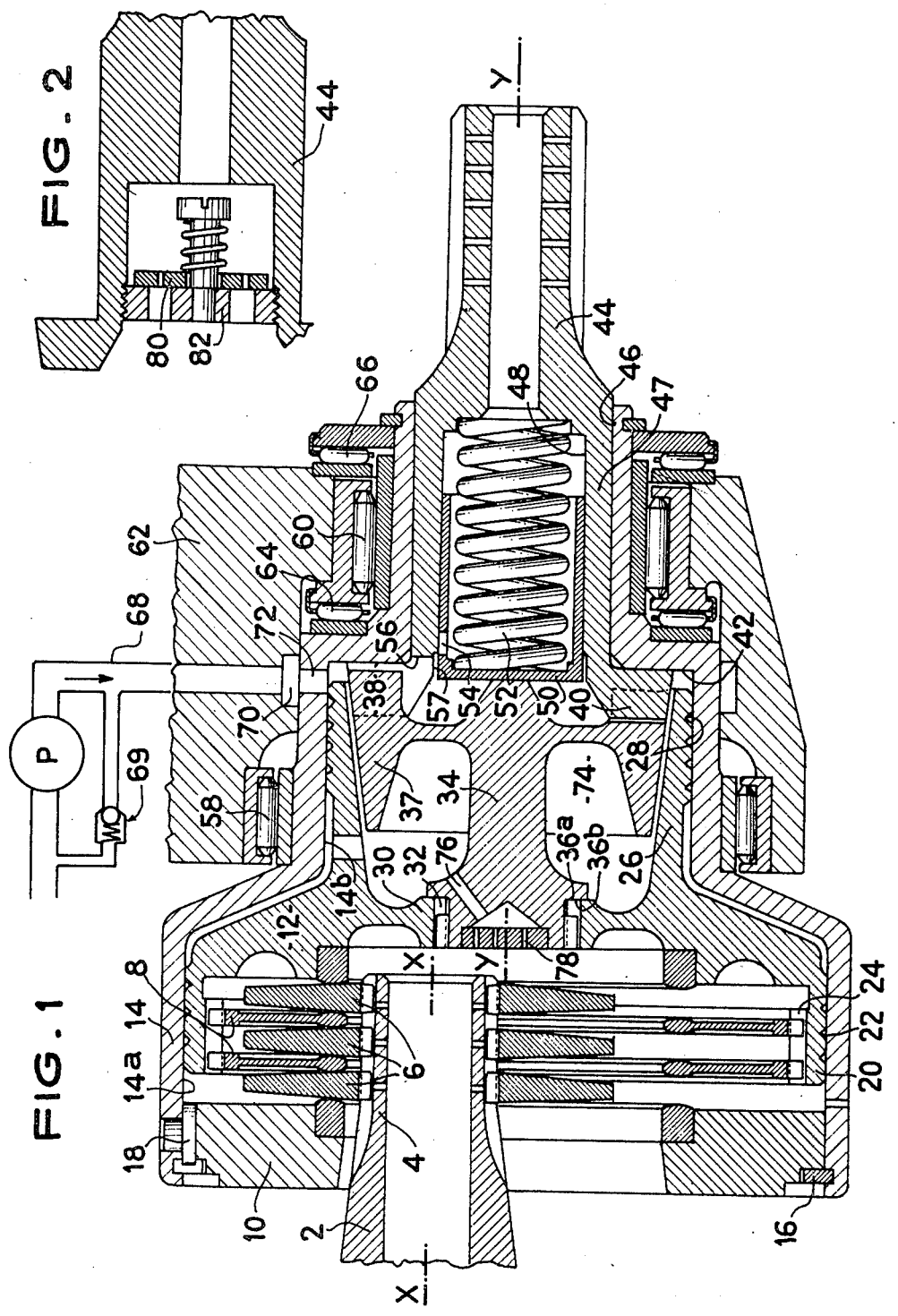

SPEED VARIATOR EMPLOYING FRICTION HAVING AN IMPROVED FRICTION ELEMENTS-TIGHTENING DEVICE

The present invention relates to speed-variators of the type comprising a first series of friction elements, such as discs, connected to rotate with a first shaft and clamped between the elements of a second series of friction elements, such as rings, which are connected to rotate with a second shaft parallel with the first shaft, means being provided for varying the eccentricity between the axes of the two shafts.

In variators of the aforementioned type, it is common practice to achieve the clamping or tightening together of the two series of friction elements, on one hand, by tightening means furnishing a force which is proportional to the torque and comprising two sets of associated helical ramps and, on the other hand, by metal springs which exert a pre-tightening force, the first tightening means becoming operative only when the variator transmits a torque.

Now, these pre-tightening springs have a serious drawback, namely:

either they are so designed and chosen that the force that they exert is sufficient when the lubricating oil is at its normal temperature of operation and are then too weak when the oil is cold and consequently less fluid (in this case the tightening forces are insufficient to break the film of oil between the friction elements and this results in a harmful slip when starting up), or they are so designed and chosen that the force that they exert is sufficient when the oil is cold, and the friction element tightening force then becomes excessively high when the oil is warm, which results in a rapid wear of the variator and in particular the friction elements.

An object of the present invention is to overcome this drawback and to provide a variator in which the pre-tightening force is adapted to the conditions of operation of the variator.

According to the invention, there is provided a speed variator comprising a first series of friction elements connected to rotate with a first shaft and tightened between elements of a second series of friction elements which are connected to rotate with a second shaft parallel to the first shaft, means being provided for varying the eccentricity between the axes of the two shafts, and a device for tightening the friction elements against each other comprising pre-tightening means and main tightening means which exert a force which is proportional to the torque transmitted, wherein the pre-tightening means comprise at least one piston and cylinder arrangement defining a chamber which is connected to a source of lubricating oil for the variator and also to a discharge path whose section is sufficiently small with respect to the rate of flow of the lubricating oil supply to ensure that the fluid contained in said chamber is maintained under pressure.

When the main tightening means comprise a plate which tightens or clamps together the friction elements and is guided in a housing, the cylinder is preferably constituted by said housing whereas the piston is constituted by the tightening plate which comprises at least one bearing surface guided by a corresponding surface of the housing.

According to other features of the invention of interest:

The discharge path comprises a series of small-section orifices disposed in the centre part of the tightening plate in front of the first shaft which is hollow and has radial orifices for the purpose of lubricating splines carried by this shaft.

The pressure chamber is defined partly by a movable wall biased by elastically yieldable means to its position in which the volume of the chamber tends to be reduced, this wall having for function to compensate for a sudden variation in the volume of the chamber upon a rapid increase in the ratio of speed reduction of the variator.

Means for modulating the pressure of the pre-tightening in accordance with the transmission ratio are provided.

As will be seen from the ensuing description, these various features give the desired result by particularly simple means.

The ensuing description will be made with reference to the accompanying drawing which is given merely by way of example and in which:

FIG. 1 is an axial sectional view of a speed variator according to the invention, and FIG. 2 is a partial view of a modification of the variator.

In the speed variator shown in FIG. 1 a hollow input shaft 2 having an axis X—X has a splined end portion 4 on which slidable discs 6 are mounted.

These discs are interposed between rings 8 and a support plate 10 and a tightening or clamping plate 12.

The support plate 10 is mounted at an end of a housing 14 in which a stop ring 16 prevents the plate from moving in the longitudinal direction and a key 18 prevents the plate from rotating.

The tightening or clamping plate 12 is extended on one side by a cylindrical portion or skirt 20 which is guided in a corresponding part $14^a$ of the housing 18. This cylindrical portion of the plate has, externally, a helical groove 22 which promotes the lubrication and, internally, splines or grooves 24 which cooperate with corresponding splines of the rings 8.

This tightening plate 12 is extended on the side thereof opposed to the cylinder 20 by another cylindrical portion or skirt 26 of smaller diameter which is also received in a corresponding part $14^b$ of the housing. A helical groove 28 formed on the skirt 26 facilitates the lubrication.

The tightening plate 12 is connected to a hub 30 provided with inner splines 32 which cooperate with outer splines on a shaft 34. The latter bears axially against the hub 30 by radial surfaces $36^a$, $36^d$.

The shaft 34 is connected to a ring 37 provided with a series of ramps 38, preferably three in number, evenly spaced apart on a circumference concentric with the shaft 24. The ramps 38 cooperate with conjugate ramps 40 which bear against a shoulder 42 of the housing 14. The ramps 38 and 40 constitute the main tightening means for the discs 6 and plates 8. The ramps 40 are connected to a hollow output shaft 44 having an axis Y—Y which is in the extension of the shaft 34 and fitted in a bore 46 of the housing 14.

The output shaft 44 has an enlarged cylindrical portion 47 defining a cavity 48 in which there is slidable a hollow piston 50 which is biased against the shaft 34 by a spring 52. The piston 50 has a lateral orifice 54 located in the vicinity of an end face or edge 56 of a recess 57 provided between the ramps 40. The function of this orifice will be explained hereinafter.

The housing assembly 14 is journalled by two rolling bearings 58, 60 in a rocker 62 with respect to which it is prevented from moving axially by the action of two thrust bearings 64, 66.

A passage 68 for supplying lubricating oil is formed in the rocker 60. This passage 68 is connected to the delivery side of a pump P supplying the lubricating oil for the variator. This pump is provided with a relief valve 69 performing the function of a pressure limiter. The passage 68 communicates with a recess 70 disposed in front of a conduit 72 in the housing 14. This conduit 72 communicates with a chamber 74 defined by the housing 14, the tightening plate 12, the shaft 34 and the hollow piston 50. The communication of the conduit 72 with the chamber 74 is by way of a gap between the skirt 26 and the ring 37. As can be seen in the drawing, the chamber 74 is not fluidtight and has oil escape path means mainly: the helical groove 28 which permits lubrication of the skirt 26, the helical groove 22 which permits the lubrication of the skirt 20; a conduit 76 formed in the shaft 34 in series with orifices 78 which ensure that oil is sprayed onto the discs 6 and in the hollow shaft 2, and a part of the orifice 54.

These orifices however represent a relatively small total section which produces a sufficient pressure drop for maintaining the whole of the chamber 74 under pressure and therefore ensuring a pre-tightening between the discs and the ring. Moreover, the relief valve 69 is chosen in such manner as to permit the establishment of sufficient pressure in the chamber 74. It is sufficient that the escape rate of flow allowed by this valve be sufficiently low.

When the oil is rendered less fluid by a drop in the temperature, the pressure drops for its flow are increased and this increases the pressure in the chamber 74 and therefore the pre-tightening force.

Thus it can be seen that the desired result has been obtained, since the pre-tightening force is directly related to the fluidity of the oil. By way of example, whereas the total tightening force is a given variator may be of the order of 1000 kilograms, the variation in the force under the effect of a variation of temperature and viscosity of the oil may reach 250 kilograms in the structure of the invention. Indeed, the pressure of this oil at normal temperature of operation is 3 to 4 bars whereas at a temperature of 0° C it can rise to 5 or 6 bars. The difference of 2 bars applied to the surface of the tightening plate produces the increase of 250 kilograms mentioned hereinbefore. This increase is therefore very important and permits avoiding slip when starting up under cold conditions.

When the speed variator is moved rapidly from the position corresponding to zero eccentricity (axes X—X and Y—Y of the shafts 2 and 44 coaxial) to the position of maximum eccentricity (represented in the drawing), the tightening plate 12 is displaced toward the right, as viewed in FIG. 1 which would have for effect to decrease the volume of the chamber 74 and increase the tightening force. The shifting of the hollow piston 50 under the thrust exerted by the oil in opposition to the action of the spring 52 remedies this drawback.

Moreover, apart from these rapid movements, the orifice 54 is uncovered to an extent which varies with the transmission ratio. There is therefore established in the chamber 74 a higher pressure when the transmission ratio is lower (maximum eccentricity) than when it is equal to unity (zero eccentricity). There is thus obtained a further correction of the tightening force as a function of the transmission ratio which is added to the correction of the tightening force as a function of the torque obtained by ramps 38.

This correction, although desirable, could be considered as unnecessary and, in a modification shown in FIG. 2, the piston 50 is replaced by a relief valve 80 provided in a wall 82 defining the pressure chamber. A minimum escape path is provided for lubricating the output shaft 44.

There may be mentioned as another modification, disposing in series with the relief valve associated with the pump P a slide valve or like closure means having two positions in the case where the relief valve would allow an excessively high escape rate of flow. In one of its two positions, the slide valve would limit this escape rate of flow to a predetermined suitable value in order to permit the establishment of a sufficient pressure in the chamber 74. In its second position, it would no longer limit the escape path through the relief valve. This closure means may be controlled by any known means manually or automatically, for example in accordance with the temperature.

Having now described my invention what I claim as new and desire to secure by Letters Patent is:

1. In a speed variator comprising a housing, a first shaft, a second shaft parallel to the first shaft, friction elements, a first series of said friction elements connected to rotate with the first shaft, a second series of said friction elements connected to rotate with the second shaft, the first series of elements being tightenable between the second series of elements, means for varying the eccentricity between the axes of rotation of the two shafts, and a device for tightening the friction elements against each other comprising a support member fixed to the housing at a first end of the friction elements, a tightening member mounted to be movable in the housing in a direction parallel to the shafts and located adjacent a second end of the friction elements opposed to said first end and movable to exert a pressure on said second end of the friction elements to urge the friction elements against the support member, pre-tightening means cooperable with the tightening member to exert a pre-tightening force on the tightening member substantially just enough to tighten the friction elements together and render them sufficiently effective when starting to transmit torque through the variator, and main tightening means cooperable with the tightening member for exerting a force on the tightening member which is proportional to the torque transmitted; the improvement comprising for constituting the pre-tightening means at least one piston and cylinder arrangement defining a chamber and interposed between the housing and the tightening member, a source of lubricating oil for the variator, lubricating oil path means putting said source in communication with surfaces of the variator which need to be lubricated, means connecting said lubricating oil path means to the chamber, a lubricating oil discharge path means connected to the chamber, the discharge path means having a sufficiently small cross section with respect to the rate of flow of the lubricating oil from the source to ensure that the lubricating oil contained in the chamber is maintained under pressure for exerting a pre-tightening force on the tightening member prior to the exertion of the tightening force by the main tightening means.

2. A speed variator as claimed in claim 1, wherein the tightening member is a plate guided in the housing, said cylinder being constituted by the housing, and said piston being constituted by the tightening plate which has at least one bearing surface, a corresponding surface of the housing guiding the bearing surface of the tightening plate.

3. A speed variator as claimed in claim 1, wherein the first shaft has splines, the discharge path means comprises a series of orifices of small section disposed in a centre portion of the piston in front of the first shaft which is hollow and has radial orifices for lubrication the splines of the first shaft.

4. A speed variator as claimed in claim 1, wherein the pressure chamber is defined in part by a movable wall, and elastically yielding means bias the movable wall in a direction to tend to reduce the volume of the chamber.

5. A speed variator as claimed in claim 4, wherein the second shaft is hollow and has an enlarged portion which is open at the end thereof located in the variator and in which enlarged portion there is slidably mounted a second piston constituting said movable wall.

6. A speed variator as claimed in claim 1, comprising means for modulating the pre-tightening pressure as a function of the transmission ratio.

7. A speed variator as claimed in claim 5, comprising means for modulating the pre-tightening pressure as a function of the transmission ratio, said modulating means comprising said second piston in the form of a hollow piston having a lateral wall, a discharge orifice in the lateral wall of the piston and means defining a valving edge which is fixed relative to said chamber and is capable of masking the second discharge orifice to an extent which varies with the position of the second piston.

8. A speed variator as claimed in claim 1, wherein a relief valve is provided in a wall partly defining the pressure chamber.

9. A speed variator as claimed in claim 1, wherein the source of lubricating oil comprises pumping means supplying the pressure chamber with oil and a relief valve for limiting the pressure of the oil, and there is provided in series with said relief valve an additional valving member having at least two positions, one of which positions corresponds to a limitation of the rate of flow allowed by the relief valve.

* * * * *